Patented Feb. 1, 1949

2,460,439

UNITED STATES PATENT OFFICE 2,460,439

BENZOYL PEROXIDE BLEACHING COMPOSITION

Robert S. Whiteside, Scarsdale, N. Y., and Chester H. Allen, Cincinnati, Ohio, assignors, by mesne assignments, to Winthrop-Stearns Inc., New York, N. Y., a corporation of Delaware No Drawing. Application July 16, 1946, Serial No. 683,999

6 Claims. (Cl. 99—232)

The presents invention relates to a composition of matter useful in the bleaching of cereal products and more particularly to a composition of matter containing benzoyl peroxide especially adapted for use in the bleaching of flour.

Benzoyl peroxide is will known as a bleaching agent for flour and other products but has been subject to recognized difficulties and disadvantages as used according to accepted practices. When pure benzoyl peroxide is utilized such small amounts have to be added to the flour that it is difficult and inconvenient to make the additions and/or to secure good distribution through the large mass of flour. One direct result is that too much or too little is added, thus resulting in over-bleached or underbleached flour. A practice has grown up of diluting the pure benzoyl peroxide with inert ingredients which are innocuous and which do not unduly increase the ash content of flour. This results in a considerable improvement in the mechanics of handling the bleaching agent and adding the same to the flour, but still leaves much to be desired in other respects. One of the commonly employed inert ingredients is calcium sulfate which is a somewhat unsatisfactory material to handle because, in the form in which it has been heretofore used it has a definite tendency to form aggregates in the nature of discrete particles of substantial size. These discrete particles are, furthermore, of different sizes and they are non-uniform as to their composition. This causes difficulty as can well be appreciated and these difficulties are directly related to the physical form and condition of the calcium sulfate. Calcium sulfate as heretofore recommended for use contains at least two mols of water of crystallization and sometimes more. There has been a theory that hydrated calcium sulfate containing two or more mols of water of crystallization prevents lumping of a composition containing it and the benzoyl peroxide together with other fillers but we have found that such is not borne out in actual commercial operations and that the above-mentioned aggregates are unavoidably formed. The lumps or aggregates being non-uniform in composition and having a composition which necessarily differs from the average composition of the composition of matter at the time of its formation or preparation robs the composition of a substantial proportion of its calcium sulfate since this ingredient tends to be the one causing most difficulty. There is apparently some limited but definite amount of deliquescence which causes a localized wetting or dampening of the composition and the consequent formation of the aggregates by accretion and by the adherence of the other ingredients. It has previously been considered that anhydrous calcium sulfate was unsuccessful for the foregoing purpose because of its alleged hygroscopicity. This is not in accordance with our experience and contrary to expectations neither lumps nor aggregates form in our present composition at any time even though the same contains a relatively large percentage of anhydrous calcium sulfate.

One of the objects of our invention is to produce a benzoyl peroxide bleaching composition which is characterized by freedom from the formation of lumps and aggregates at all times and which is free from water of crystallization as to the calcium sulfate ingredient thereof.

Another object of the invention resides in the incorporation of anhydrous calcium sulfate as one of the important ingredients in a benzoyl peroxide bleaching composition which is entirely successful and operative in all respects.

A further object of the invention resides in the provision of a benzoyl peroxide bleaching composition which has enhanced bleaching power per unit of weight and for a given content of benzoyl peroxide.

Other and further objects and advantages will be appreciated by those skilled in this art or will be pointed out hereinafter as this description proceeds.

Our new bleaching composition may take either one or two primary forms. One form consists of benzoyl peroxide, anhydrous calcium sulfate and magnesium carbonate in intimately mixed, finely subdivided form having unusual free-flowing characteristics and high penetrability into flour. In its other primary form the composition is in a special physical condition in which it exerts a substantially increased bleaching effect relative to the amount of benzoyl peroxide present.

The benzoyl peroxide is the active bleaching component of our composition. The amount incorporated in a given composition may range up to about 30% of 98-99.5% material. The preferred range is about 10-26% and approximately 20% has been found to give optimum results. The balance of the composition is made up of inert materials which preferably consist of anhydrous calcium sulfate and magnesium carbonate. These inert ingredients may constitute as little as about 70% and as much as about 90% of the total weight of the composition. The preferred range is about 90-74% of which the anhydrous calcium sulfate constitutes about 80-95% and the magnesium carbonate constitutes about 20-5%.

While the inert ingredients act as fillers and extenders, the anhydrous calcium sulfate also serves to prevent the formation of aggregates and the magnesium carbonate contributes to and materially enhances the free-flowing characteristics of the composition as a whole. Talc or alumina may optionally replace the magnesium carbonate in whole or in part.

The invention is illustrated by the following examples without being limited thereto.

Example 1

| | Per cent |
|---|---|
| Benzoyl peroxide (98–99.5%) | Approximately 20 |
| Anhydrous calcium sulfate | Approximately 72 |
| Magnesium carbonate | Approximately 8 |

Example 2

37.2 pounds of caustic soda are added to 45 gallons of water and to this solution 57.5 pounds of 27% hydrogen peroxide are run in slowly while maintaining the temperature at not over 10° C., preferably at −5° to −10° C. 180 pounds of anhydrous calcium sulfate and 20 pounds of magnesium carbonate are then incorporated in the batch and uniformity is obtained by stirring or agitation. While maintaining the temperature within the range specified, 99 pounds of benzoyl chloride are slowly or gradually added and the entire mass is stirred until the reaction is complete. Stirring may be continued for about two hours or more. The entire mass of material is then filtered to remove the liquid fraction, and the solid residue is dried in an ordinary hot-air drying house at a temperature of about 65° C. After drying, the mass is ground in a standard impact grinder at ordinary temperatures without exclusion of air.

It will be understood that the form of anhydrous calcium sulfate used in our invention is the form which hydrates only with extreme slowness when in contact with water. This form is known as the dead-burnt form (see page 775 of volume III of Mellor's "A Comprehensive Treatise On Inorganic and Theoretical Chemistry," Longmans, Green and Co., fourth impression, July 1941).

The benzoyl peroxide bleaching composition responding to the present invention may be in the form of a finely divided, intimate admixture of the ingredients specified but is preferably made in accordance with the procedure described in our co-pending application Serial No. 683,998, filed July 16, 1946, now abandoned, for Method of making benzoyl peroxide, in accordance with which we avoid the use or formation of benzoyl peroxide in undiluted form for the reasons there outlined. Our composition may, however, be alternatively prepared, if desired, by thoroughly admixing undiluted benzoyl peroxide with the fillers specified and particularly with anhydrous calcium sulfate and magnesium carbonate in the proportions set forth above. Such composition of matter can be used to bleach flour and other cereal products with complete success but especially when the composition is made in accordance with our aforesaid co-pending application we have found that the bleaching results surpass the results which can be secured by prior known or proposed procedures. In this connection the bleaching power exerted by our new composition is at least 15% to 50% greater than that of prior compositions containing the same percentage of benzoyl peroxide. In one particular instance, ¼ oz. of a 20.9% benzoyl peroxide bleaching composition responding to our present invention gave a better, faster and more complete bleach to 55% cut-off flour than could be obtained from ½ oz. of an existing product containing 15.7% of benzoyl peroxide.

The foregoing is presented as illustrative and not as limitative and within the scope of the appended claims other and further modifications may be made without departing from the spirit or principle hereof.

We claim:

1. A benzoyl peroxide bleaching composition comprising a finely divided intimate admixture of inert materials containing up to about 30% of benzoyl peroxide, a major portion of said inert materials being dead-burnt anhydrous calcium sulfate.

2. A benzoyl peroxide bleaching composition comprising a finely divided, intimate admixture of about 90–74% inert materials and about 10–26% of benzoyl peroxide, a major portion of said inert materials being dead-burnt anhydrous calcium sulfate.

3. A benzoyl peroxide bleaching composition comprising about 20% benzoyl peroxide and about 80% of inert materials a major portion of which is dead-burnt anhydrous calcium sulfate.

4. A benzoyl peroxide bleaching composition comprising about 20% of benzoyl peroxide, about 72% of dead-burnt anhydrous calcium sulfate and about 8% of magnesium carbonate.

5. A composition of matter adapted for bleaching purposes comprising predominantly inert materials having benzoyl peroxide adsorbed on the particles thereof, a major portion of said inert materials being dead-burnt anhydrous calcium sulfate.

6. A composition of matter adapted for bleaching purposes comprising approximately 80% of inert materials and approximately 20% of benzoyl peroxide, the benzoyl peroxide being in the form of fine particles adsorbed on fine particles of the inert materials, a major portion of which is dead-burnt anhydrous calcium sulfate.

ROBERT S. WHITESIDE.
CHESTER H. ALLEN.

REFERENCES CITED

The following references are of record in the file of this patent:

UNITED STATES PATENTS

| Number | Name | Date |
|---|---|---|
| 1,787,402 | Stoddard | Dec. 30, 1930 |
| 2,207,737 | Hooft | July 16, 1940 |
| 2,272,576 | Penn | Feb. 10, 1942 |
| 2,272,577 | Penn | Feb. 10, 1942 |
| 2,335,856 | Hooft | Dec. 7, 1943 |